(12) United States Patent
Liu et al.

(10) Patent No.: US 7,546,791 B2
(45) Date of Patent: Jun. 16, 2009

(54) SAW BLADE LIFTING MECHANISM FOR SAWING MACHINE

(75) Inventors: Chia-Sheng Liu, Chiayi County (TW); Yu-Feng Chan, Kaohsiung County (TW)

(73) Assignee: Durg Machinery Corp., Taichung (TW)

( * ) Notice: Subject to any disclaimer, the term of this patent is extended or adjusted under 35 U.S.C. 154(b) by 281 days.

(21) Appl. No.: 11/482,763

(22) Filed: Jul. 10, 2006

(65) Prior Publication Data
US 2007/0227327 A1 Oct. 4, 2007

(30) Foreign Application Priority Data
Mar. 30, 2006 (TW) .............................. 95205332 U

(51) Int. Cl.
*B27B 5/24* (2006.01)
*B27B 5/36* (2006.01)
(52) U.S. Cl. ................. 83/477.1; 83/477.2; 83/581; 83/665; 83/698.51
(58) Field of Classification Search ............... 83/471.3, 83/472, 473, 477–477.2, 581, 665, 698.51
See application file for complete search history.

(56) References Cited
U.S. PATENT DOCUMENTS
1,527,587 A * 2/1925 Hutchinson ............... 83/471.3
1,821,113 A * 9/1931 Neighbour .................... 83/473
4,308,777 A * 1/1982 Lawson ...................... 83/477.2
6,736,044 B2 * 5/2004 Chang .......................... 83/473

* cited by examiner

*Primary Examiner*—Boyer D. Ashley
*Assistant Examiner*—Edward Landrum
(74) *Attorney, Agent, or Firm*—Browdy and Neimark, P.L.L.C.

(57) ABSTRACT

A saw blade lifting mechanism for a sawing machine includes a fixed table having a bottom transverse rod, a bracket pivoted to, a support member fastened to the transverse rod and provided with a sliding slot, a swinging member pivoted to the bracket and turnable backwards and forwards, a motor fixedly fastened to the swinging member and provided with an output shaft fastened with a saw blade, a first connecting member pivoted to the bracket, a second connecting member pivotally coupled between the first connecting member and the motor, a knife member affixed to the second connecting member, and a guide member affixed to the second connecting member and moveably inserted into the sliding slot of the supporting member such that when the swinging member is turned backwards or forwards the saw blade and the knife member can be synchronously lifted up or lowered down.

7 Claims, 9 Drawing Sheets

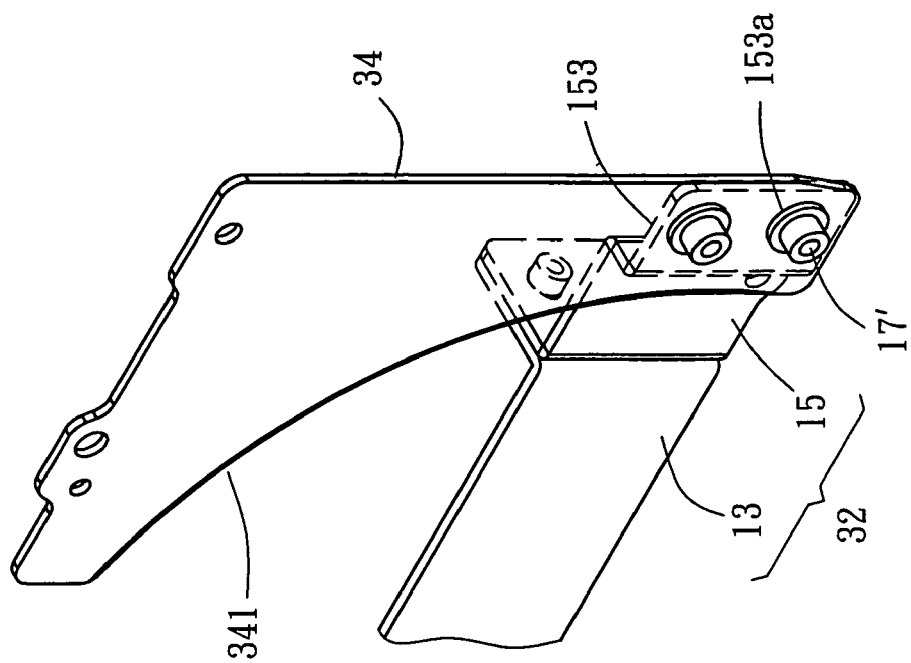
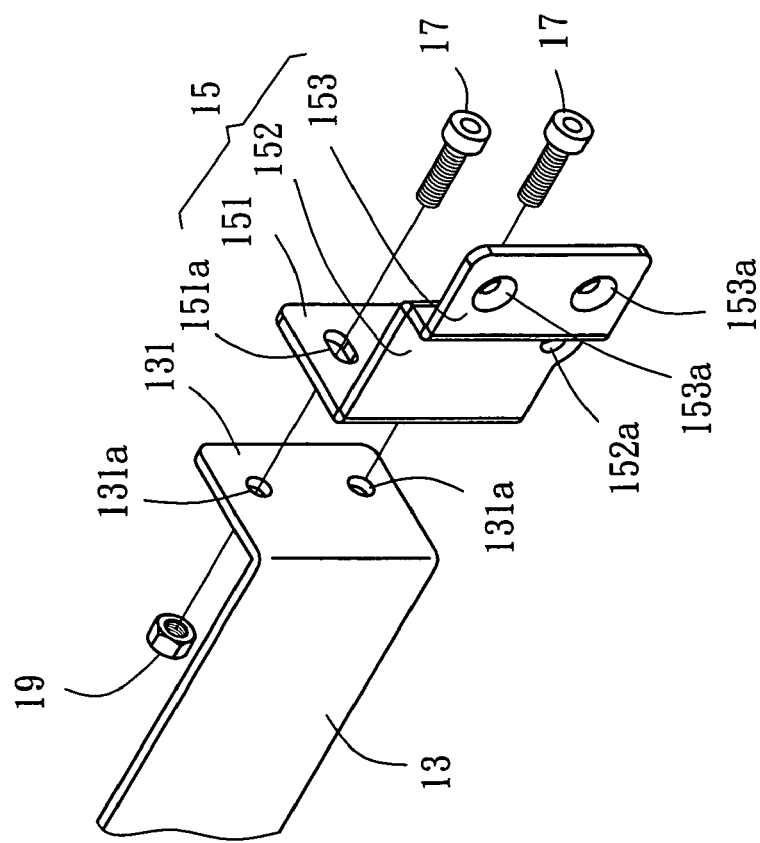

SAW BLADE LIFTING MECHANISM FOR SAWING MACHINE

BACKGROUND OF THE INVENTION

1. Field of the Invention

The present invention relates to sawing machines and more specifically, to a saw blade lifting mechanism for a sawing machine.

2. Description of the Related Art

A conventional sawing machine 1, as shown in FIGS. 1 and 2, comprises a machine base 2, a hand wheel 3, a mounting seat 4, a motor 5, a saw blade 6, and a knife member 7. The mounting seat 4 has a rear top end pivoted to a locating portion 2a of the machine base 2, and two opposite bottom grooves 4a. The front end of the mounting seat 4 is connected to the housing of the motor 5. The saw blade 6 is fastened to the output shaft 5a of the motor 5. The hand wheel 3 is adapted to rotate a screw rod 3a in the machine base 2 and to further move a link 3b that is screwingly sleeved onto the screw rod 3a along the screw rod 3a. The link 3b has two distal ends respectively coupled to the grooves 4a of the mounting seat 4. Therefore, when rotating the hand wheel 3 clockwise or counter-clockwise, the link 3b is moved forwards or backwards along the screw rod 3a, and the mounting seat 4 is biased relative to the machine base 2 to lift or lower the motor 5 and the saw blade 6. Because the motor 5 and the saw blade 6 are supported on one end of the mounting seat 4 remote from the pivot joint between the mounting seat 4 and the machine base 2, the pivot joint between the mounting seat 4 and the machine base 2 may wear quickly after a long time of use, resulting in deviation of the saw blade 6 from the lifting path. Further, the saw blade 6 may vibrate during cutting, resulting in a cutting inaccuracy. Furthermore, because the knife member 7 is fixedly fastened to one side of the top wall of the machine base 2 and protruding over the corresponding side edge of the machine base 2, the user may be hindered by the protruding part of the knife member 7 when operating the sawing machine.

Therefore, it is desirable to provide a saw blade lifting mechanism for sawing machine that eliminates the aforesaid drawbacks.

SUMMARY OF THE INVENTION

The present invention has been accomplished under the circumstances in view. It is therefore the primary object of the present invention to provide a saw blade lifting mechanism for a sawing machine, which has a support member for supporting the knife member of the sawing machine so that the knife member can be synchronously and stably lifted with the saw blade.

To achieve this object of the present invention, the saw blade lifting mechanism comprises a fixed table provided with a transverse rod at a bottom side thereof, a bracket pivoted to and turnable about the transverse rod; a swinging member pivoted to the bracket and turnable backwards and forwards in an extending direction of the transverse rod, a motor fixedly mounted on one side of the swinging member and provided with an output shaft to which a saw blade is fastened; a first connecting member having a first end pivoted to the bracket and a second end; a second connecting member having a side with a first part pivoted to the output shaft of the motor and a second part pivoted to the second end of the first connecting member; a knife member fixedly connected to the other side of the second connecting opposite to the first connecting member; a support member fixedly connected to the transverse rod and provided with a sliding slot; and a guide member fixedly connected to the second connecting member and coupled to the sliding slot of the support member for guiding movement of the second connecting member along the sliding slot of the support member such that when the swinging member is turned backwards or forwards the saw blade and the knife member can be synchronously lifted up or lowered down.

BRIEF DESCRIPTION OF THE DRAWINGS

FIG. 6 is an exploded view of the second connecting member of the saw blade lifting mechanism in accordance with the first preferred embodiment of the present invention.

FIG. 7 is a perspective assembly view of the second connecting member and the knife member of the saw blade lifting mechanism in accordance with the first preferred embodiment of the present invention.

DETAILED DESCRIPTION OF THE INVENTION

Figure 1:
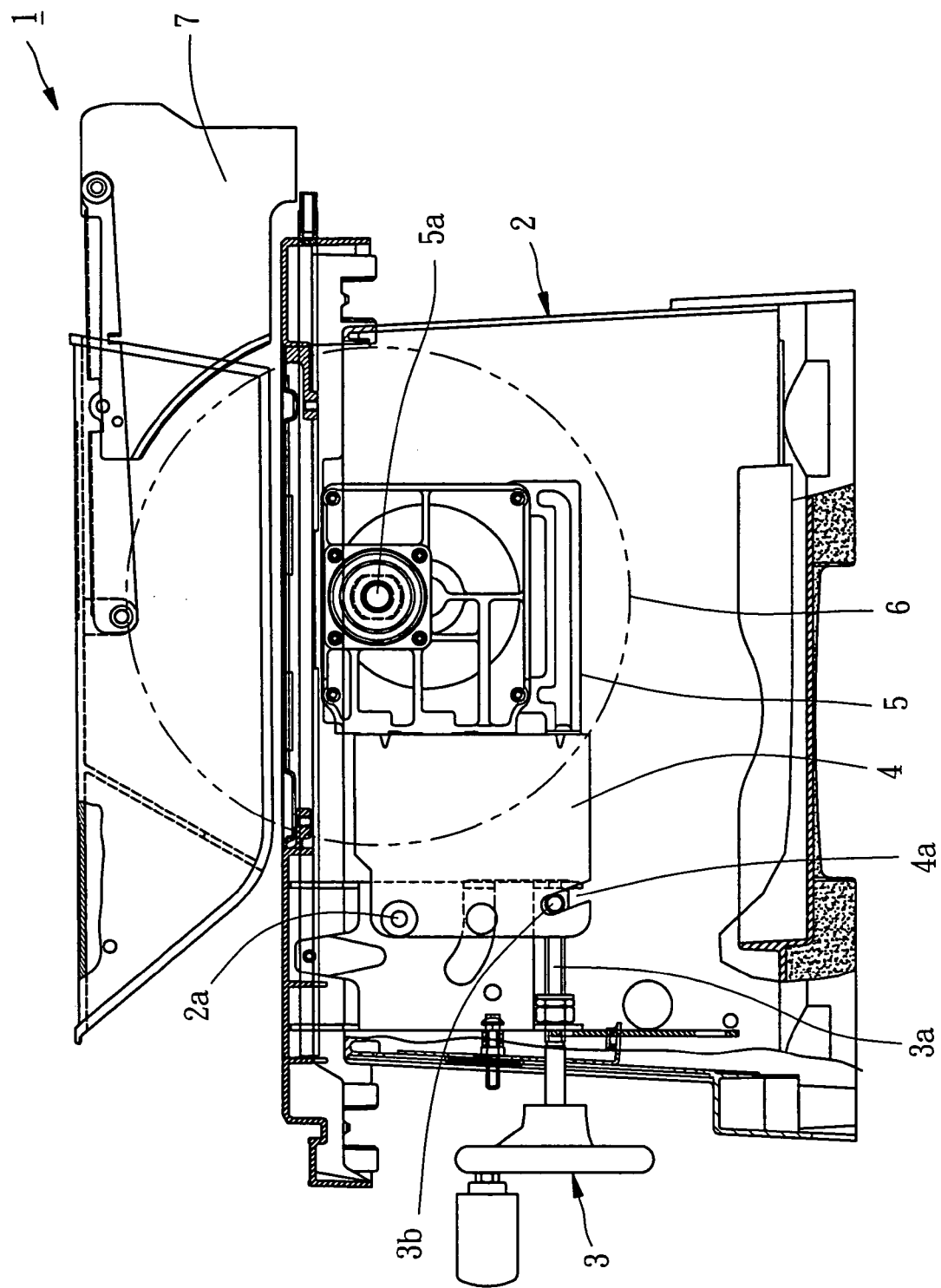
FIG. 1 is a schematic drawing of a saw blade lifting mechanism in a sawing machine according to the prior art, showing the saw blade extending out of the machine base.
Figure 2:
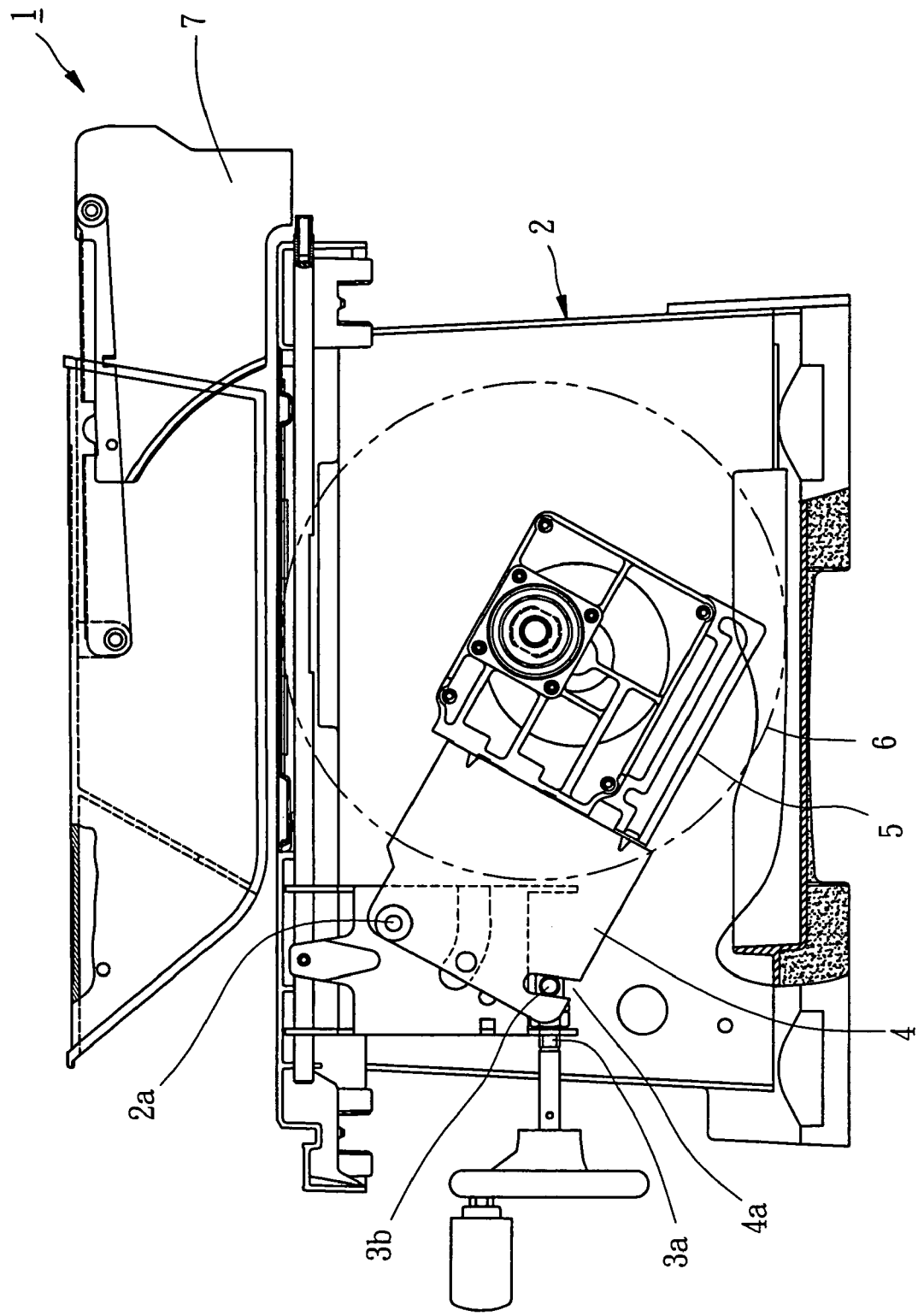
FIG. 2 corresponds to FIG. 1 but showing the saw blade received inside the machine base.

Referring to FIGS. 3-7, a saw blade lifting mechanism 10 in accordance with a first preferred embodiment of the present invention is shown comprising a fixed table 12, a bracket 14, a swinging member 16, a guide block 18, a screw rod 20, a hand wheel 22, an adapter member 24, a first connecting member 26, a motor 28, a saw blade 30, a second connecting member 32, a knife member 34, a support member 36, and a guide member 38.

The fixed table 12 has a transverse rod 121 at the bottom side thereof, and a slot 122 for the passing of the saw blade 30. The transverse rod 121 has a front end 121a and a rear end 121b.

The bracket 14 is pivotally engaged to the transverse rod 121 near the front end 121a of the transverse rod 121 and turnable about the transverse rod 121 to tilt the saw blade 30. Because the adjustment of the tilting angle of the saw blade 30 is not within the scope of the claims of the present invention, no further detailed description in this regard is necessary. According to this embodiment, the bracket 14 is a substantially invertedly disposed U-shaped frame, having two lugs 142 downwardly extending from two sides of the top panel 141 thereof and arranged in parallel.

Figure 4:
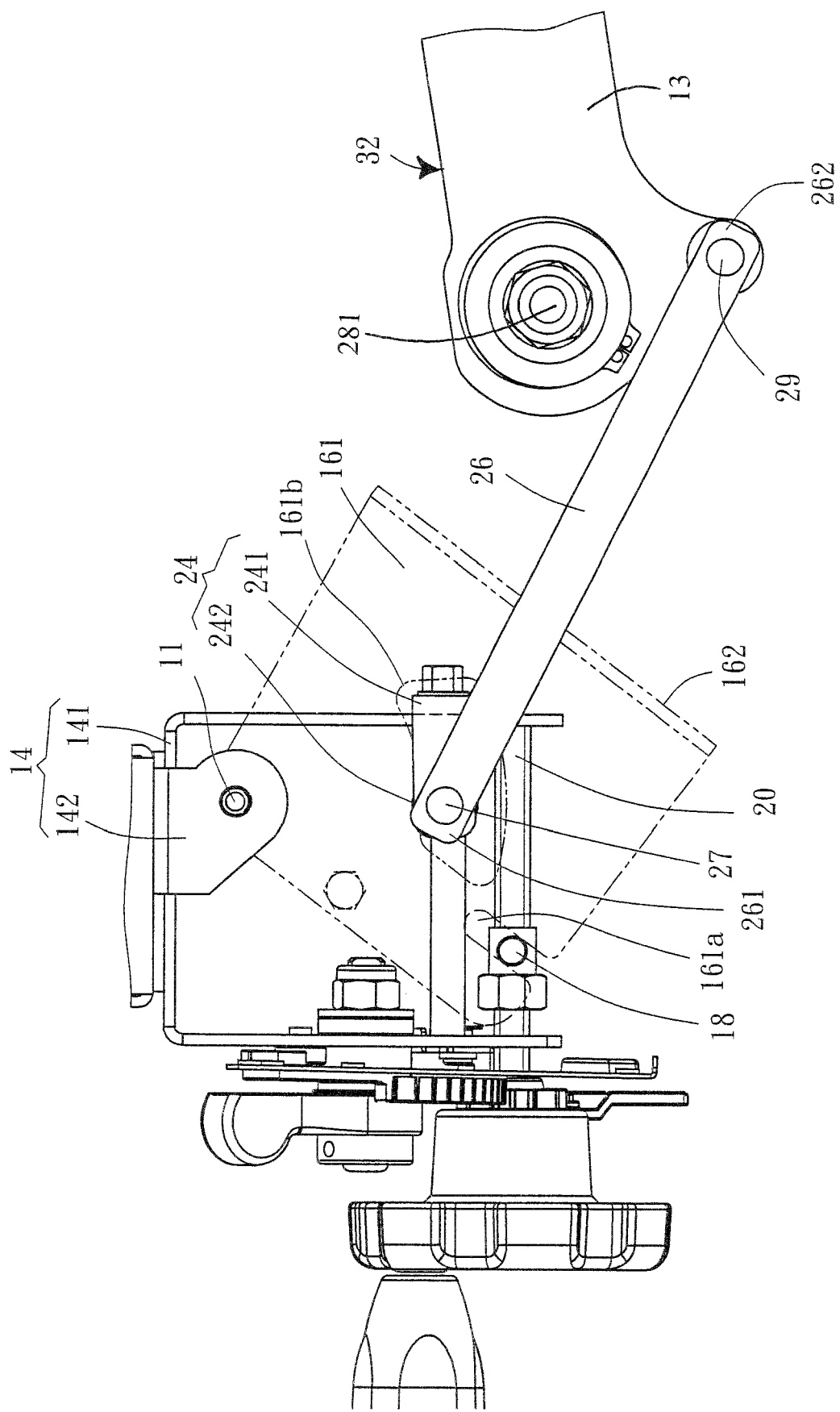
FIG. 4 is an enlarged view of a part of FIG. 3, showing the first connecting member connected to the swinging member through the adapter member.

The swinging member 16 is a substantially U-shaped frame having a top panel 162 and two side panels 161. The two side panels 161 of the swinging member 16 are pivotally coupled to the two lugs 142 of the bracket 14 by a pivot pin 11. Each side panel 161 has a notch 161a, as shown in FIG. 4. One of the two side panels 161 has an opening 161b. The motor 28 is fixedly mounted on the top panel 162 of the swinging member 16. The saw blade 30 is fastened to the output shaft 281 of the motor 28.

The screw rod 20 is arranged in parallel to the transverse rod 121, having one end inserted through the bracket 14 and threaded through the guide block 18 and extending to the space between the side panels 161 and the other end fixedly connected to the hand wheel 22. The guide block 18 has two ends respectively inserted into the notches 161a of the side panels 161 of the swinging member 16.

The adapter member 24 is an L-shaped board having a front end locked to the swinging member 16 and a rear end extending through the opening 161b of the corresponding side panel 161 of the swinging member 16 to the outside of the swinging member 16.

The first connecting member 26 is an elongated plate member having a first end 261 and a second end 262. The first end 261 is pivoted to the rear end 242 of the adapter member 24 with a pivot pin 27, and therefore the first connecting member 26 is turnable about the pivot pin 27.

Figure 3:
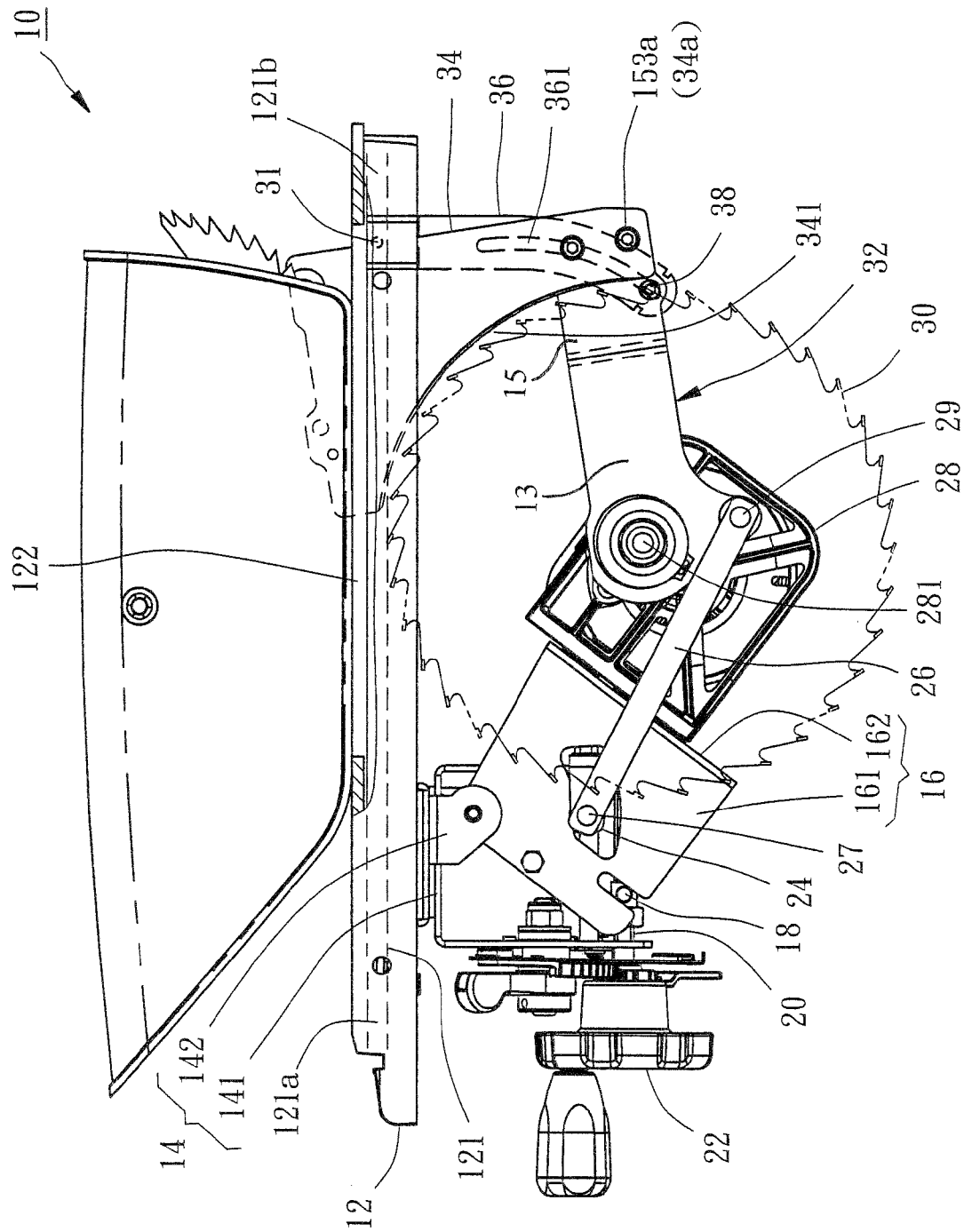
FIG. 3 is a schematic drawing of a saw blade lifting mechanism in accordance with a first preferred embodiment of the present invention, showing the saw blade received below the fixed table.
Figure 5:
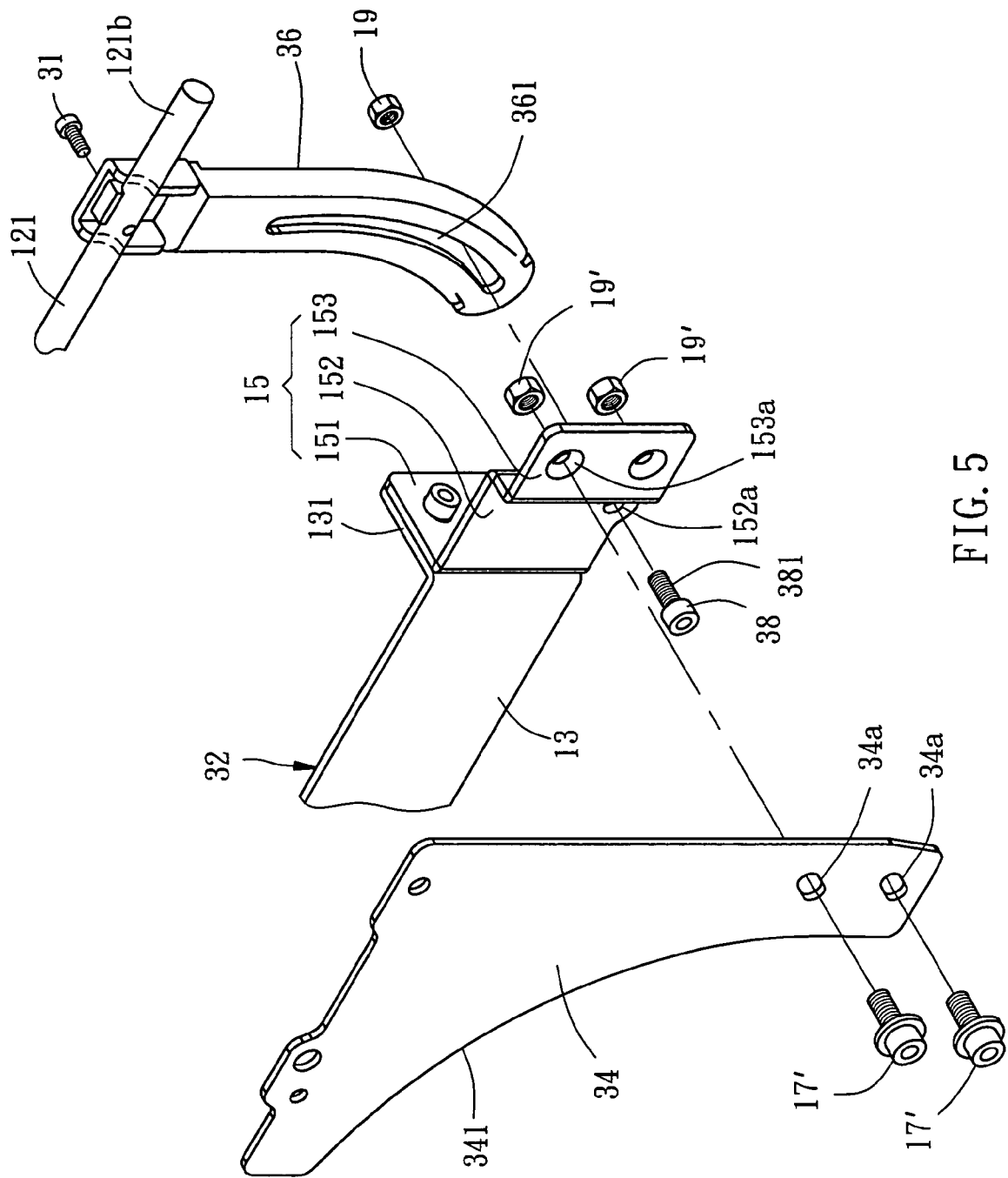
FIG. 5 is an exploded view of the knife member, the second connecting member, the guide member and the support member of the saw blade lifting mechanism in accordance with the first preferred embodiment of the present invention.

As shown in FIGS. 5 and 6, the second connecting member 32 is formed of a first plate member 13 and a second plate member 15. As shown in FIGS. 3, 4 and 5, the first plate member 13 has a first part pivotally engaged to the output shaft 281 of the motor 28, a second part, namely a rear end, pivotally engaged to the second end 262 of the first connecting member 26 by a pivot pin 29, and a front end terminating in a flange 131, which has two through holes 131a. The second plate member 15 is a stepped plate member having a rear portion 151, a front portion 153, and a middle portion 152 connected between the rear portion 151 and the front portion 153. The rear portion 151 has two elongated slots 151a. Two screw bolts 17 are respectively inserted through the elongated slots 151a of the rear portion 151 and the through holes 131a of the first plate member 13 and threadably secured with a respective nut 19 to secure the first plate member 13 and the second plate member 15 together. The middle portion 152 has a locating hole 152a. The front portion 153 has two locating holes 153a.

Figure 9:
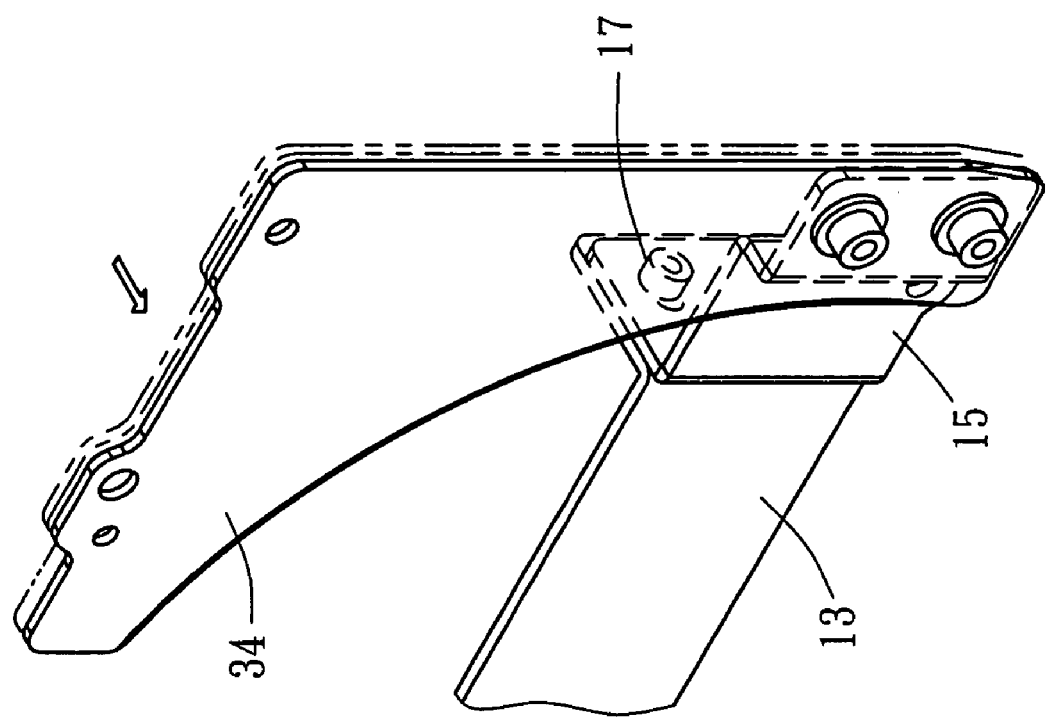
FIG. 9 corresponds to FIG. 7 but showing the position of the second plate member adjusted relative to the first plate member.

The knife member 34 is a plate member having a cutting edge 341 extending along one side thereof and two oblong slots 34a disposed near the rear end thereof. As shown in FIGS. 5 and 7, two screw bolts 17' are respectively inserted through the oblong slots 34a of the knife member 34 and the two locating holes 153a of the second plate member 15 and threadably secured with a respective nut 19' to secure the knife member34 and the second plate member 15 together, keeping the cutting edge 341 away from the toothed peripheral edge of the saw blade 30 at a distance. Further, as shown in FIG. 9, the position of the knife member 34 is adjustable relative to the saw blade 30 by means of loosening the screw bolts 17 and then moving the second plate member 15 relative to the first plate member 13 and then fastened up the screw bolts 17 again.

The support member 36 is an elongated plate member having an arched sliding slot 361. Further, one end, namely, the top end of the support member 36 is fixedly fastened to the transverse rod 121 adjacent to the rear end 121b of the transverse rod 121 with a screw bolt 31.

The guide member 38 according to the present invention is a guide screw bolt having the threaded shank 381 thereof inserted through the locating hole 152a of the middle portion 152 of the second plate member 15 and the arched sliding slot 361 of the support member 36 and threadably secured with a nut 19. By means of the guide member 38, the second connecting member 32 is movable along an arched track, i.e., the arched sliding slot 361.

The operation of the saw blade lifting mechanism 10 in lifting the saw blade 30 is described hereinafter.

FIG. 3 illustrates the saw blade 30 received below the fixed table 12. At this time, the guide block 18 at the screw rod 20 is disposed near the hand wheel 22, and the guide member 38 is stopped at the bottom end of the arched sliding slot 361 of the support member 36, and therefore the saw blade 30 is stopped from downward movement.

Figure 8:
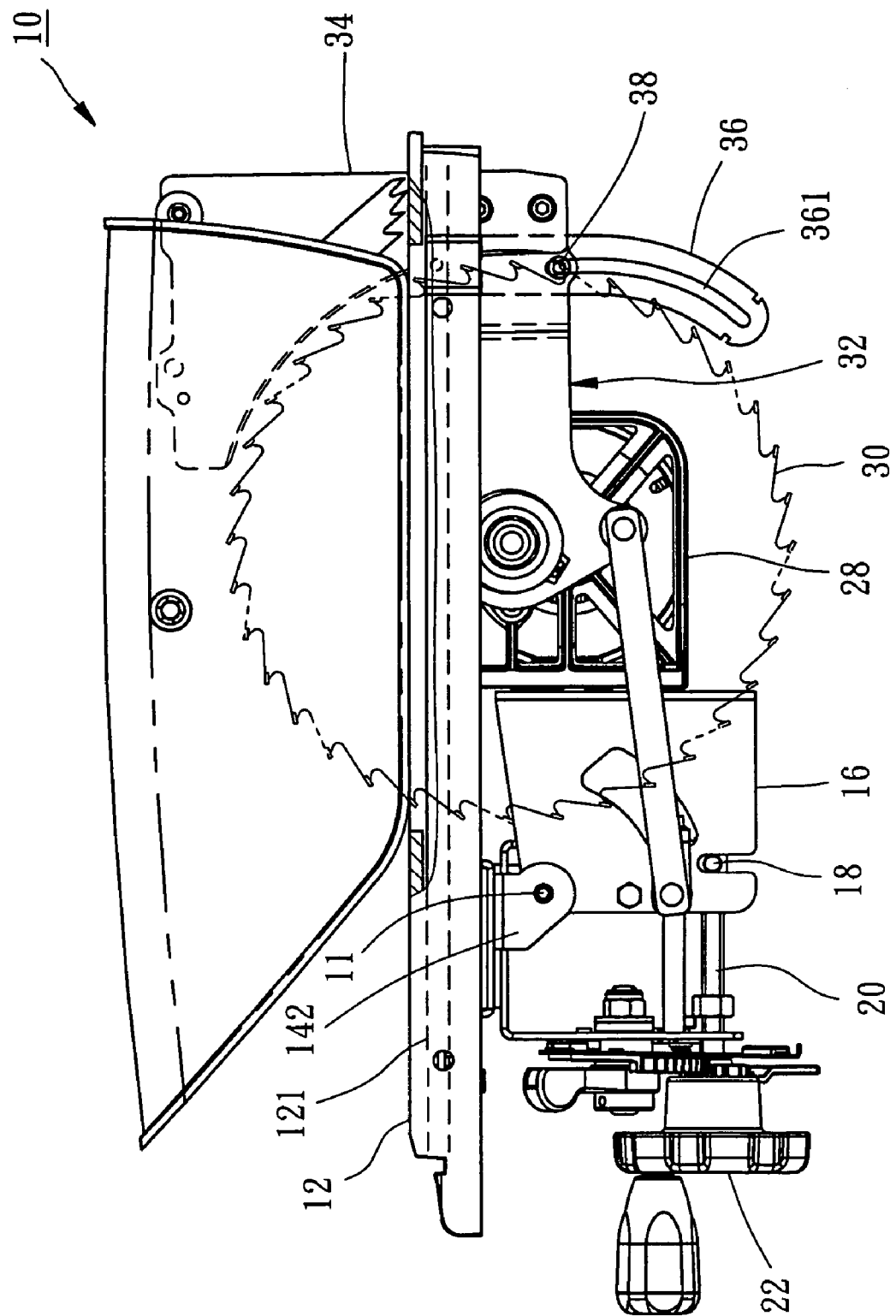
FIG. 8 is a schematic drawing of the saw blade lifting mechanism in accordance with the first preferred embodiment of the present invention, showing the saw blade extending out of the fixed table.

Referring to FIG. 8, when rotating the hand wheel 22 to cause movement of the guide block 18 along the screw rod 20 toward the saw blade 30, the swinging member 16 is forced to turn about the pivot pin 11 and to further lift the saw blade 30 and the knife member 34. According to this embodiment, the second connecting member 32 is connected between the motor 28 and the support member 36 and constrained by the coupling between the arched sliding slot 361 of the support member 36 and the guide member 38. Therefore, lifting the saw blade 30 does not cause vibration of the saw blade 30.

Figure 10:
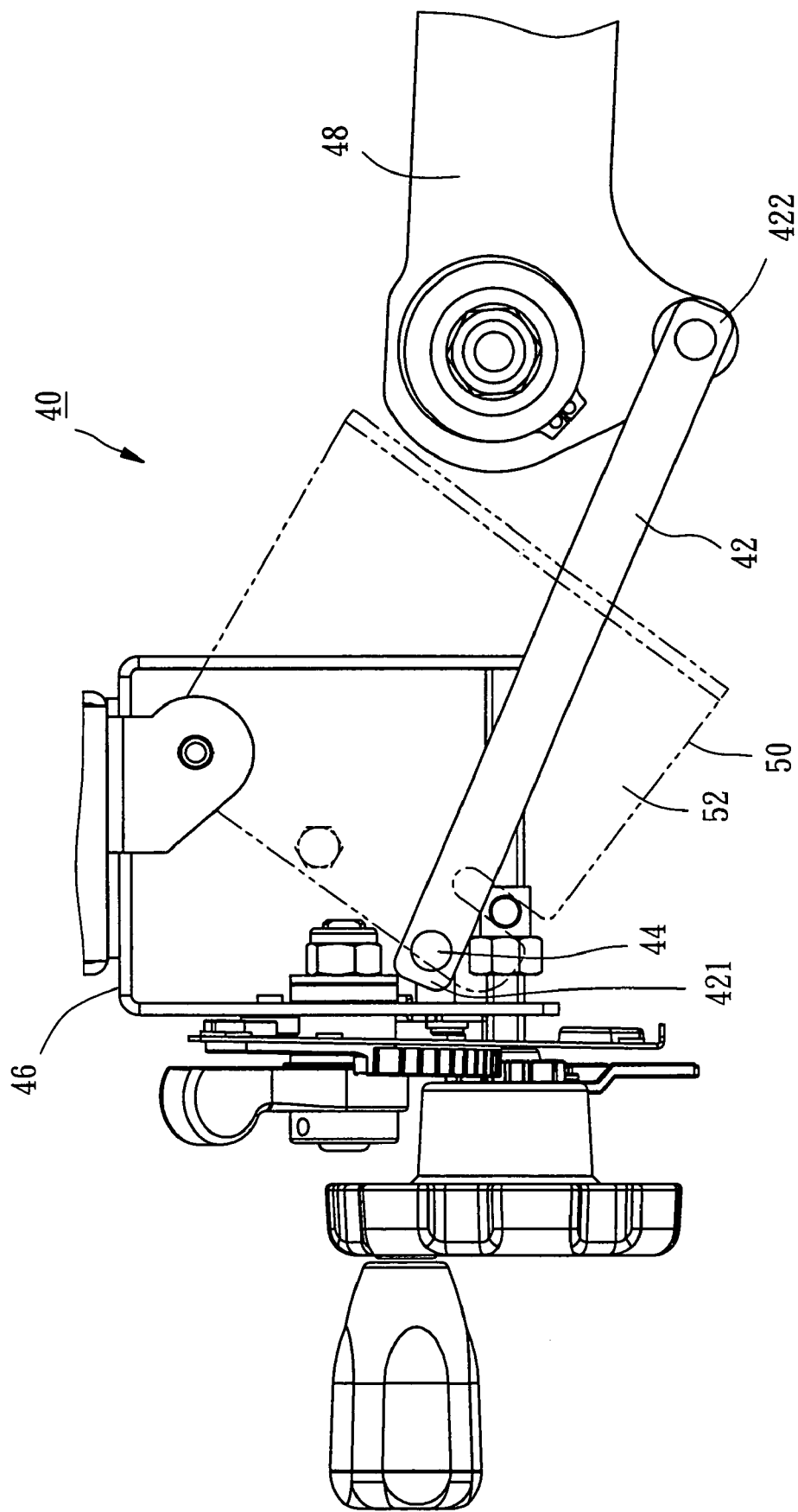
FIG. 10 is a schematic drawing of a saw blade lifting mechanism in accordance with a second preferred embodiment of the present invention, showing the connecting member fastened to the swinging member.

FIG. 10 illustrates a saw blade lifting mechanism 40 in accordance with a second embodiment of the present invention. This second embodiment is substantially similar to the aforesaid first embodiment with the exception of the connection between the first connecting member and the swinging member. As illustrated the first connecting member 42 has a first end 421 pivotally engaged to the swinging member 50 by a pivot pin 44, and a second end 422 pivotally engaged to the second connecting member 48. This second embodiment eliminates any 161 opening on the side panels 52 of the swinging member 50 and the use of the adapter member 24 shown in the aforesaid first embodiment, thereby reducing manufacturing costs.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A saw blade lifting mechanism comprising:
   a fixed table having a transverse rod at a bottom side thereof;
   a bracket pivotally engaged to said transverse rod and rotatable about said transverse rod;
   a swinging member pivotally engaged to said bracket and rotatable about an axis perpendicular to an extending direction of said transverse rod;
   a motor fixedly mounted to a side of said swinging member, said motor having an output shaft;
   a saw blade fastened to the output shaft of said motor;
   a first connecting member having a first end pivotally engaged to said bracket, and a second end;
   a second connecting member being pivotally engaged to both the output shaft of said motor and to the second end of said first connecting member;
   a knife member fixed to said second connecting member opposite to said first connecting member;

a support member fixedly connected to said transverse rod and provided with a sliding slot; and a guide member fixedly connected to said second connecting member and coupled to the sliding slot of said support member for guiding movement of said second connecting member along the sliding slot of said support member.

2. The saw blade lifting mechanism as claimed in claim 1, wherein said bracket has two parallel lugs; said swinging member is pivotally coupled to the two parallel lugs of said bracket by pivot pin.

3. The saw blade lifting mechanism as claimed in claim 2, wherein said swinging member has two parallel side panels, each of which has a notch; the saw blade lifting mechanism further comprising a hand wheel, a screw rod, and a guide block; said screw rod having a first end fixedly connected to said hand wheel and a second end inserted through said bracket member and said guide block toward said swinging member, said guide block having two distal ends respectively coupled to the notches of the side panels of said swinging member and movable backwards and forwards upon rotation of said screw rod.

4. The saw blade lifting mechanism as claimed in claim 3, wherein one of the side panels of said swinging member has an opening; the saw blade lifting mechanism further comprising an adapter member having a first end fixedly connected to said bracket and a second end extending through the opening of the side panel of said swinging member and pivotally engaged to the first end of said first connecting member.

5. The saw blade lifting mechanism as claimed in claim 4, wherein said second connecting member comprises a first plate member and a second plate member, wherein said first plate member is pivotally engaged to both the output shaft of said motor and to the second end of said first connecting member and has a front end terminating in a flange, which has a through hole, said second plate member having a rear portion, a front portion, and a middle portion connected between said rear portion and said front portion, said rear portion having an elongated slot through which a screw bolt is inserted and the screw bolt is further inserted through the through hole of said first plate member and threadably secured with a nut, said middle portion having a locating hole, said front portion having a locating hole; said guide member is a guide screw bolt having a threaded shank inserted through the locating hole of said middle portion of said second plate member and the sliding slot of said support member and threadably secured with a nut; said knife member has at least one oblong slot through which a screw bolt is inserted and the screw bolt is inserted through the locating hole of said front portion of said second plate member and threadably secured with a nut to fix said knife to said second plate member.

6. The rip fence as claimed in claim 5, wherein said support member is an elongated plate member having a top end fixedly connected to said transverse rod and the sliding slot of said support member is an arched sliding slot to which said second connecting member is moveably coupled.

7. The saw blade lifting mechanism as claimed in claim 1, wherein said second connecting member comprises a first plate member and a second plate member, said first plate member is pivotally engaged to both the output shaft of said motor and to the second end of said first connecting member and has a front end terminating in a flange, which has a through hole, said second plate member having a rear portion, a front portion, and a middle portion connected between said rear portion and said front portion, said rear portion having an elongated slot through which a screw bolt is inserted and the screw bolt is further inserted through the through hole of said first plate member and screwed with a nut, said middle portion having a locating hole, said front portion having a locating hole; said guide member is a guide screw bolt having a threaded shank inserted through the locating hole of said middle portion of said second plate member and the sliding slot of said support member and threadably secured with a nut; said knife member has at least one oblong slot through which a screw bolt is inserted and the screw bolt is inserted through the locating hole of said front portion of said second plate member and threadably secured with a nut to fix said knife to said second plate member.

* * * * *